United States Patent [19]

Pellegrini

[11] Patent Number: 4,651,069
[45] Date of Patent: Mar. 17, 1987

[54] BACK-EMF BRUSHLESS D.C. MOTOR DRIVE CIRCUIT

[76] Inventor: Gerald N. Pellegrini, 37 Granby Rd., Worcester, Mass. 01604

[21] Appl. No.: 703,731

[22] Filed: Feb. 21, 1985

Related U.S. Application Data

[63] Continuation-in-part of Ser. No. 484,178, Apr. 13, 1983, Pat. No. 4,494,054.

[51] Int. Cl.$^4$ ............................................... H02P 6/02
[52] U.S. Cl. ..................................... 318/254; 318/138; 318/439; 318/721
[58] Field of Search ............... 318/138, 254, 439, 711, 318/718, 719, 721, 722

[56] References Cited

U.S. PATENT DOCUMENTS

| | | | |
|---|---|---|---|
| 3,200,315 | 8/1965 | Thompson | 318/138 |
| 3,909,690 | 9/1975 | Sugiura | 318/254 A |
| 3,959,700 | 5/1976 | Sugiura et al. | 318/254 |
| 4,156,168 | 5/1979 | Vogel | 318/254 X |
| 4,494,054 | 1/1985 | Pellegrini | 318/254 |

Primary Examiner—William M. Shoop, Jr.
Assistant Examiner—Bentsu Ro

[57] ABSTRACT

The invented circuit energizes the stator windings of a brushless three phase permanent magnet rotor type motor to provide synchronism and optimum torque angle between the stator magnetic field and the rotor field independent of speed and torque thereby giving the motor the running characteristics of a d.c. motor. The circuit compensates for the voltage drop across stator phases due to conductive impedances from the voltage of the respective stator phases. The resultant back-emf voltages are used to generate directly the switching control which energizes the stator currents to flow through the stator phases from phases of highest back-emf to phases of lowest back-emf.

16 Claims, 5 Drawing Figures

BACK-EMF BRUSHLESS D.C. MOTOR DRIVE CIRCUIT

The present application is a continuation-in-part of present inventor's prior patent application Ser. No. 484,178, filed 4-13-83, having been patented with U.S. Pat. No. 4,494,054, issued 1-15-85.

BACKGROUND OF THE INVENTION

The prior art of driving brushless d.c. motors has for the most part used some kind of position signal which in turn is decoded to provide for the proper switching of the power delivered to the motor windings. Most cases use magnetic sensors (Hall Sensors) or optical sensors to provide rotor position sensing. There is one case which the applicant is aware of which processes or integrates the back-emf signal to produce a position signal. There have also been three phase brushless d.c. motor drive circuits which use the ratio of the back-emf signals of two of its phases to provide for the proper energizing of the third phase.

The attempt to provide for back-emf commutation of brushless d.c. motors has been active for a variety of reasons among them being the elimination of positioning sensors in the motor with their troublesome implementation and calibration. Also back-emf commutation can provide for greater realiability and efficiency over speed and torque ranges. In the past back-emf commutation, has been too complicated and costly for widespread use. A disadvantage of back-emf commutation is the necessity of a separate starting circuit to provide torque to the motor until a sufficient back-emf is generated to operate self-commutation. There exist although methods which will provide a starting mode for self-commutating motors. For example the motor may be run as a stepper motor for an initial period.

SUMMARY OF THE INVENTION

The present invention substantially simplifies the circuitry required to produce back-emf self-commutation of brushless d.c. motors. The present invention energizes the motor windings in such a way that an electric current flows through the windings from the highest back-emf phase to the lowest back-emf phase by switching transistors controlled by the same highest and lowest back-emf and without the need for any position signal. For this reason the invention also has the characteristic of operating a single phase motor once it is started and multiple phase motors by simply adding phases to the commutating circuitry. The invented circuit also provides for the compensation of the voltage drop due to conductive impedances in any particular phase of the motor, thereby producing a back-emf signal of that respective phase whether or not the same phase is energized. The back-emf signals of all the phases of the motor are then directed to rectifying circuitry which activates control transistors and the power transistors in such a way that whichever phase back-emfs are conducting in the rectifying circuitry those same phases are also energized with current flowing through the phase windings from highest back-emf to lowest back-emf. The invention may also operate in a unipolar mode where only highest back-emf phases are energized by the positive potential source and where the common point of the phase windings is connected to the negative potential sink, or where only lowest back-emf phases are energized by the negative potential sink and where the common point is connected to the positive potential source.

BRIEF DESCRIPTION OF THE DRAWINGS

FIG. 1 also illustrates the operation of the invention when the voltage drop across the phase windings due to conductive impedances is small compared with the generated back-emf and no compensation for this voltage drop is needed.

DETAILED DESCRIPTION

Figure 1:
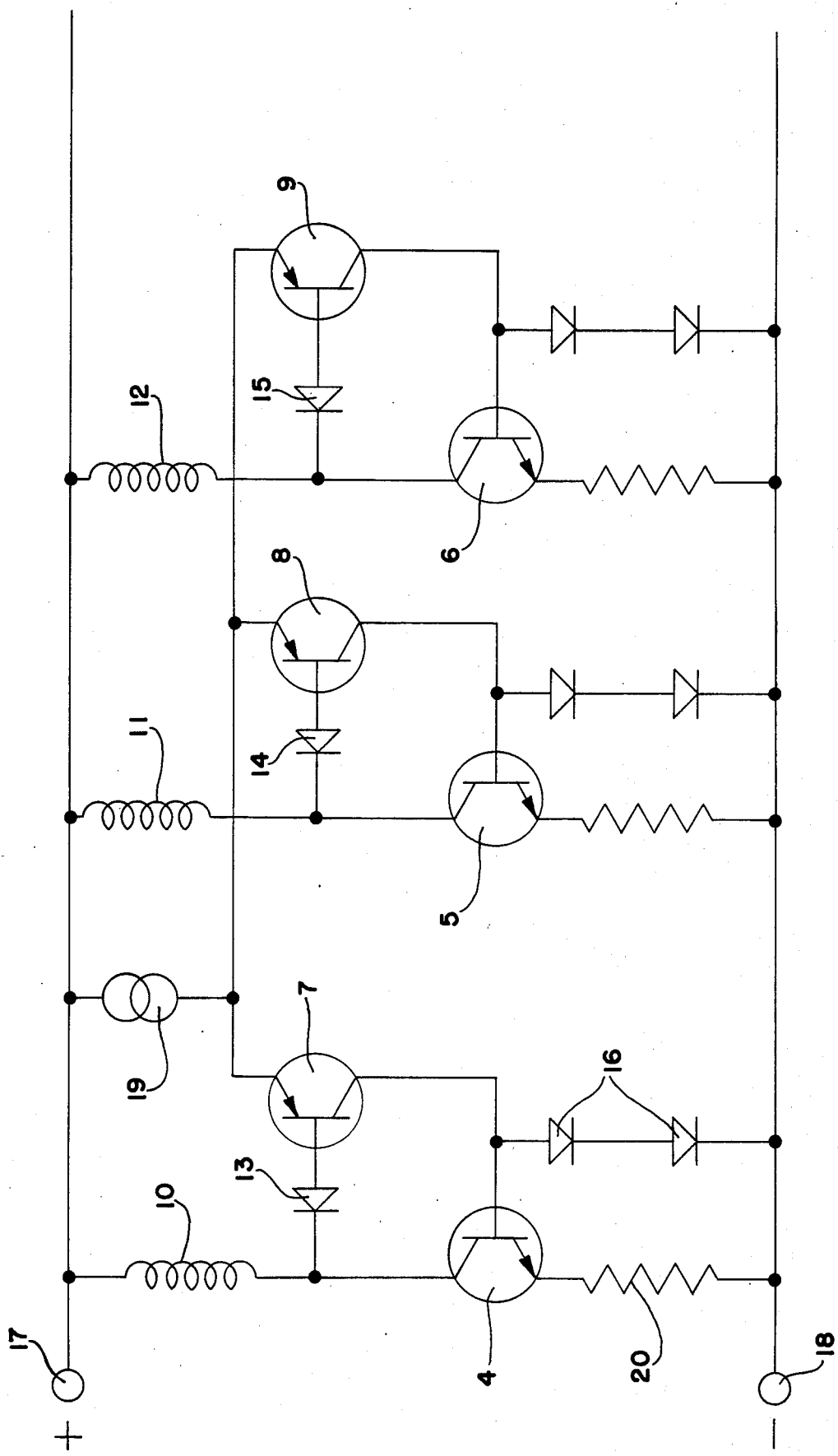
FIG. 1 is a schematic diagram illustrating the self-commutating drive circuit of the present invention operating a three phase motor in a unipolar mode with the center point of the windings being connected to the positive source potential.

Describing first the circuit of FIG. 1, there is shown three phase windings 10, 11, and 12 whose common point is connected to the positive potential terminal of the d.c. electric power 17. Power transistors 4, 5, and 6 energize the phase windings 10, 11, and 12 respectively. Also in turn transistors 4, 5, and 6 are brought into a conducting state when base drive transistors 7, 8, and 9 respectively are brought into conduction. The diodes 13, 14, and 15 being connection between the terminals of phases 10, 11, and 12 respectively and transistors 7, 8, and 9 respectively whose emitters in turn are connected to a common point of current source 19 form three-phase half-wave rectifying and switching circuitry. Current from current source 19 will flow at any one time to the phase terminal of lowest electrical potential, thereby bringing its respective base drive transistor into conduction and in turn energizing the same lowest electrical potential phase.

FIG. 1 illustrates currents provided by the resistors in the emitter circuits of the power transistors and the limited voltage applied to the bases of the power transistors.

For example when phase 10 is the lowest potential phase a current from current source 19 flows only through the base circuit of transistor 7 and the diode 13. This in turn enables current to flow from current source 19 to the base of power transistor 4, thereby energizing the same phase 10 to the negative potential 18 of the d.c. power. Also since the base voltage of transistor 4 is limited by the two diodes 16 bias voltages, the current through transistor 4 is limited by the emitter resistor 20. This limit of the current allows for the voltage drop due to conductive impedances to be small compared with the generated back-emf. Then the potential of phase 10 is approximately the generated back-emf of phase 10. It is easily seen from the circuit symetry that phases 11 and 12 in similar manner will be energized. The net result is that only the phases of lowest potential or approximately lowest back-emf will be energized. When the phases are energized in this manner the stator field remains in synchronous rotation with the rotor field independent of speed, and the torque angle between the stator field and the rotor field remains approximately optimal. It can also be easily seen that the circuit of FIG. 1 could have been done using PNP type power transistors and NPN base drive transistors and operated by switching on the positive potential power to the three phases whose common point is the negative potential power terminal. Also with one phase eliminated FIG. 1 could represent a single phase unipolar drive circuit with the winding point center connected to the positive potential. This circuit, however is limited because it requires that currents be relatively small to remain within the assumption of small conductive voltage drops.

Figure 2:
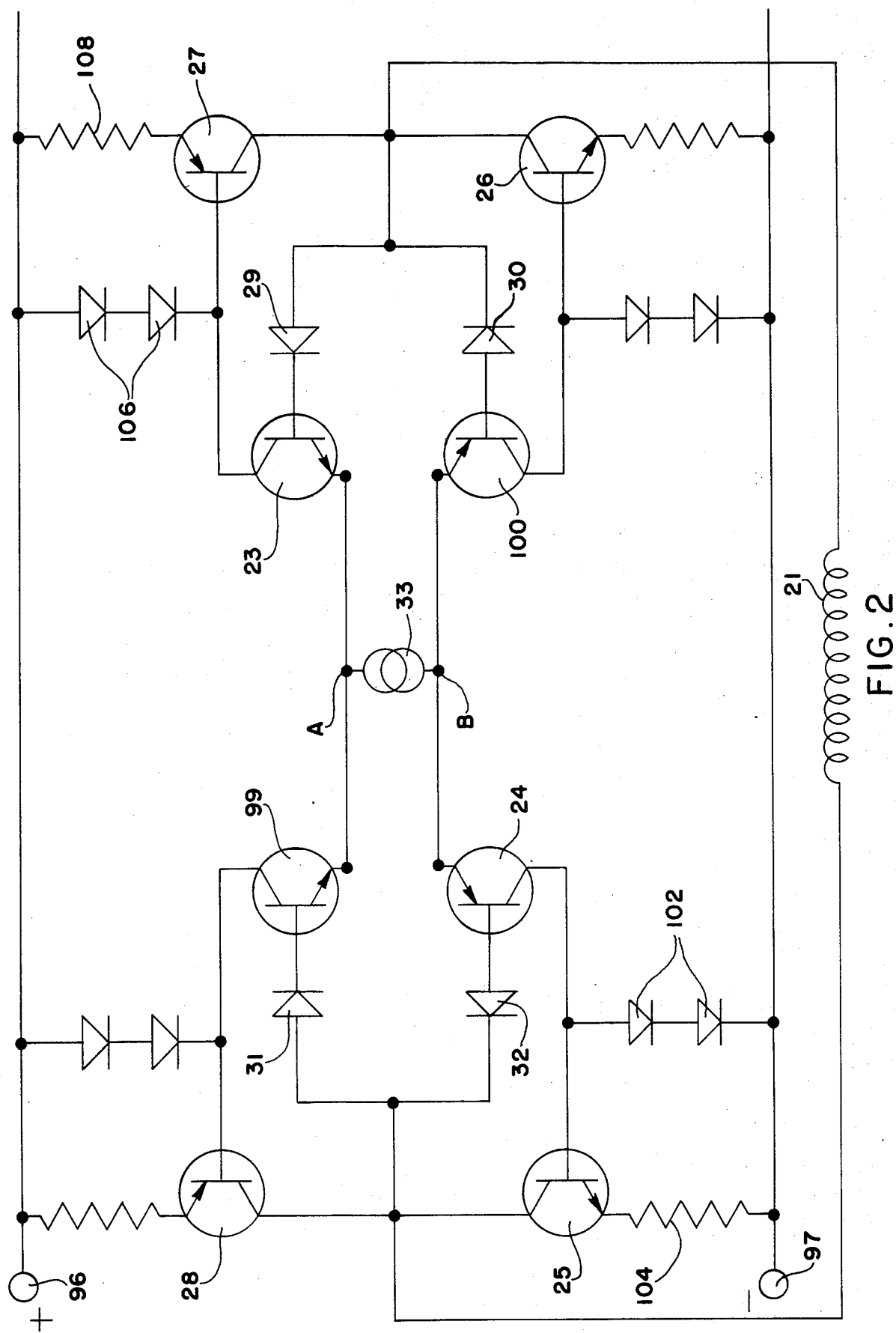
FIG. 2 is a schematic diagram illustrating the invention operating a single phase motor in a bipolar mode when no compensation for the voltage drop due to conductive impedances across the phase winding is needed.

FIG. 2 illustrates operating a single phase winding in a bipolar mode where full-wave rectification is used and the power transistors operate from the positive and negative power potentials. If, for example, the terminal of winding 21 which is connected to the common point of diodes 29 and 30 is at a higher electrical potential than the terminal connected to the common point of diodes 31 and 32, then a small current will flow through diode 29 then through base circuit of transistor 23 to point A then through current limiter 33 to point B then through base circuit of transistor 24 and then through diode 32. The current just described will put transistors 23 and 24 into conduction which in turn will put power transistors 25 and 27 into conduction. Current then flows from positive power terminal 96 through transistor 27 then through winding 21 then through transistor 25 to the negative power terminal 97. A similarly in FIG. 1 the current is limited through the power transistor 25 by the emitter resistor 104 and diodes 102 and likewise through transistor 27 by resistor 108 and diodes 106. By the circuit symmetry again it can be seen that transistors 28 and 26 will be conducting if the voltage at common point of diodes 31 and 32 is greater than common point of diodes 29 and 30. Here is also as in FIG. 1 the situation where the voltage drop due to conductive impedances by small or limited current across the phase winding 21 is small as compared to the generated back-emf. The phase winding 21 is consequently energized in such a way that current always flows through the winding 21 from approximately higher back-emf to lower back-emf. This ensures that electrical power is converted to mechanical power and the commutation is such to provide for approximately optimum torque angle independent of speed.

Figure 3:
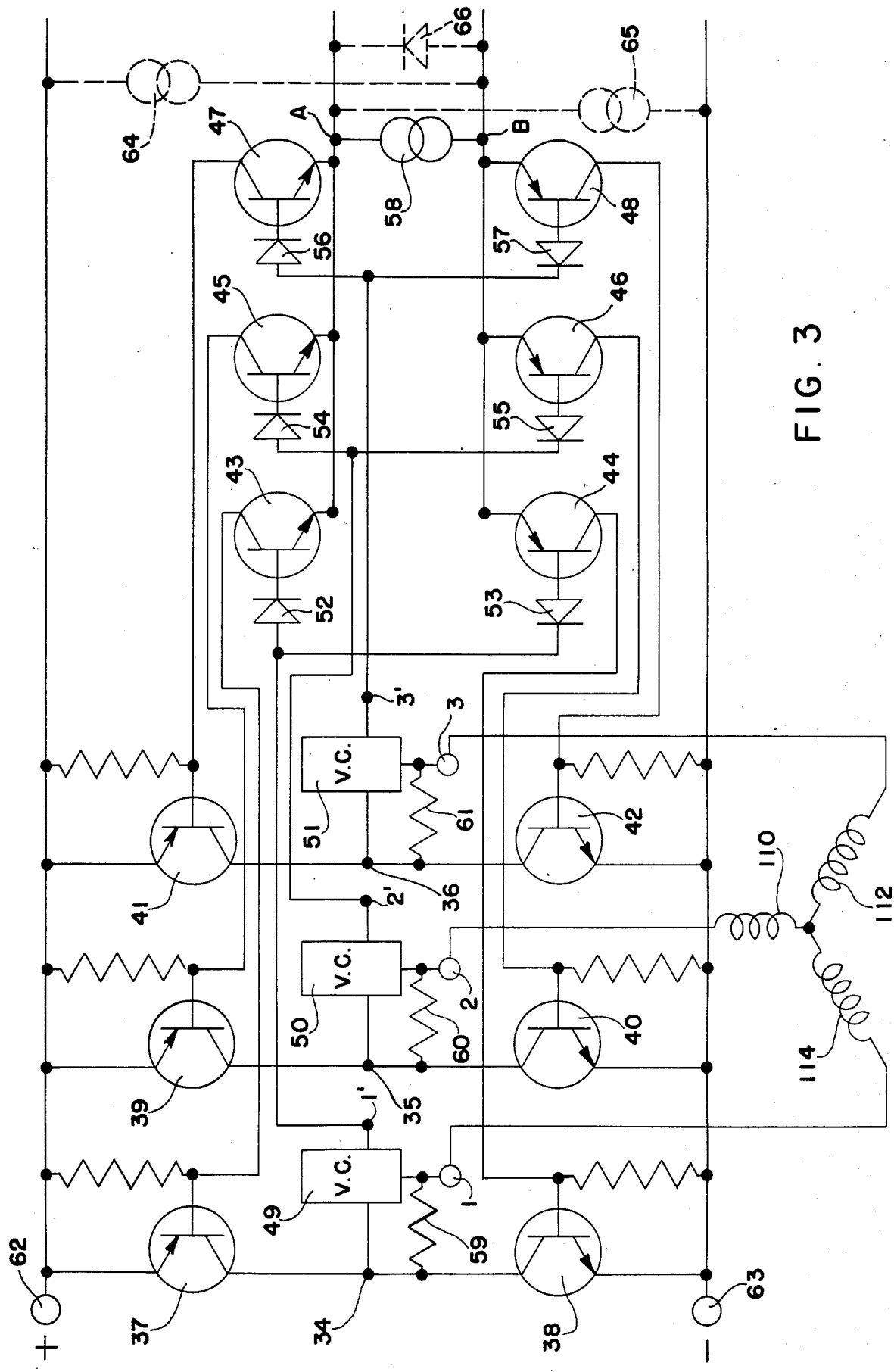
FIG. 3 is a schematic diagram illustrating the invention operating a multiphase motor (three) in a bipolar mode when compensation for the voltage drop due to conductive impedances is provided.

FIG. 3 illustrates three phase stator in a bipolar mode where compensation for conductive voltage drops across stator windings is provided. This will ensure for more proper commutation over a wide range of currents. In FIG. 3 there is shown three voltage compensation circuits (V.C.) for each phase input of a three phase stator winding. For example V.C. 49 for phase input 1, V.C. 50 for phase input 2, and V.C. 51 for phase input 3. The V.C. circuits provide for a potential difference between the phase inputs and the respective outputs of the V.C. circuits. For example in V.C. 49 a potential difference is provided between points 1 and 1'. This potential difference is tailored to the electrical characteristics of the respective stator winding and is equal to the voltage drop across the respective phase due to conductive impedances. For example the potential difference between points 1 and 1' is equal to this voltage drop across winding 114 or the phase connected to input point 1. The result of this compensation is that at points 1', 2', and 3' appears the generated alternating current (a.c.) back-emf of the three phase windings 110, 112, and 114, respectively, whether or not current is flowing in any phases. This fact is understood since at any time the potential of any phase input is equal to the generated back-emf plus any voltages due to conductive impedances in the respective phase. The three phase generated a.c. back-emfs are connected to three phase full-wave rectifying and switching circuitry consisting of six diodes 52, 53, 54, 55, 56, 57, and six transistors 43, 44, 45, 46, 47, 48, and current limiter 58. This rectifying circuitry will rectify the three phase generated a.c. back-emf into a d.c. voltage between point A and point B. This d.c. voltage represents the difference between the highest back-emf and the lowest back-emf of the three phase a.c. back-emf. At the same time the two transistors of this rectifying circuitry whose bases are connected to the highest back-emf and the lowest back-emf through their respective diodes will be activated into conduction by the action of the same highest and lowest back-emfs.

For example, if phase input 3 has the highest generated back-emf and phase input 2 has the lowest generated back-emf then as stated above point 3' will have the highest potential and point 2' will have the lowest potential of the three points 1', 2', and 3'. With this condition only diodes 56 and 55 will be in conduction. This in turn will activate transistors 47 and 46 to be in a conductive mode. Transistor 47 being in conduction switches power transistor 41 into conduction. Likewise transistor 46 being in conduction switches power transistor 40 into conduction. The net result is that a power current from positive source point 62 flows through transistor 41 to the highest back-emf phase input 3 through the current sense resistor 61 then through the stator windings 112 and 110 to the lowest back-emf phase input 2 then through the current sense resistor 60 and then through transistor 40 to the negative source point 63. From the circuit symmetry it is easily seen that whichever phase input has the highest back-emf relative to the other phase inputs will be switched on to the positive source potential, and likewise, whichever phase input has the lowest back-emf relative to the other phase inputs will be switched on to the negative source potential. This switching action of current going to the highest back-emf phase input then through the windings to the lowest back-emf phase input is generated by the back-emf voltages of the same highest and lowest back-emf phase inputs. In a real sense the motor windings are generating their own switching in the drive circuit. The dotted current sources 64 and 65 and dotted diode 66 were drawn in the FIG. 3 to illustrate the operation of the rectifying circuitry when the rectified current from the positive and negative half-cycles are independently connected to the negative potential source 63 through current limiter 65 and the positive potential source 62 through current limiter 64 respectively. The diode 66 with its bias voltage is connected between points A and B to prevent points A and B from having a voltage between them which could cause two power transistors of the same phase to be simultaneously switched on when using the independent current limiters 64 and 65. When using, however, the dependent or direct current limiter 58 no diode is needed since point B would never be at a higher potential than point A to cause a simultaneous conduction of same-phase power transistors.

Figure 4:
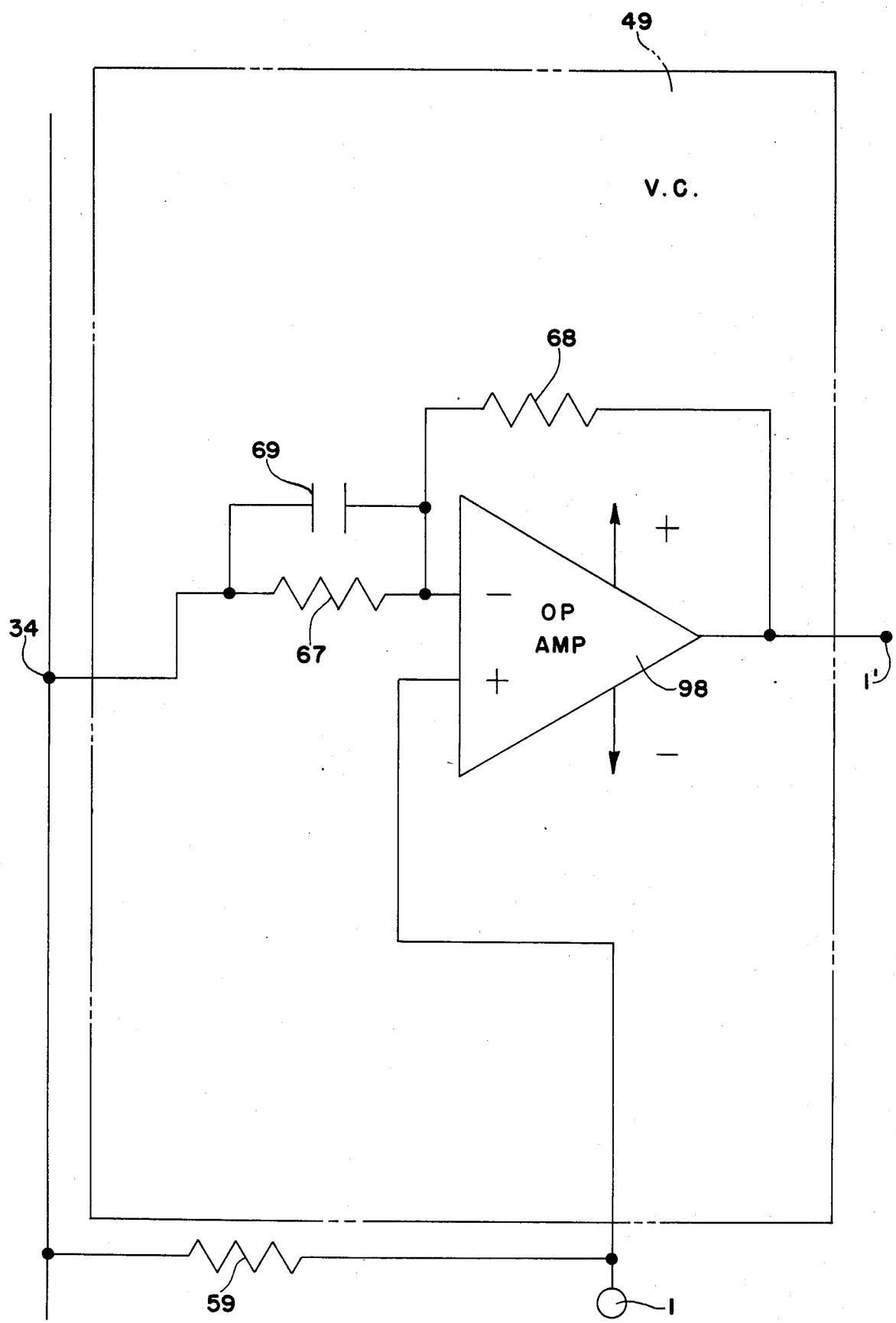
FIG. 4 and FIG. 5 are schematic diagrams illustrating the voltage compensation circuit and a complementary current type voltage compensation circuit respectively which can be used in FIG. 3 and in any application where voltage compensation is needed.

FIG. 4 illustrates compensation circuit 49. Since the voltage compensation circuits of FIG. 3 are all the same, a description of voltage compensation (V.C.) circuit 49 will be all that is required. This circuit uses the current sense resistor 59 to sense the current through phase input 1. Compensation for the conductive voltage drop across phase winding 114 is accomplished at point 1' by the circuitry of FIG. 4. By the action of OP AMP 98 the voltage at point 1'[V(1')] minus the voltage at point 1[V(1)] equals the value of resistor 68 ($R_{68}$) times the value of the current through that same resistor ($i_{68}$). Also the following relation is true:

$$i_{68} = \frac{(1 + jwR_{67}C_{69})}{R_{67}} R_{59}I_1.$$

Where:
$R_{67}$ = value of resistor 67;
$C_{69}$ = value of capacitor 69;
$w = 2\pi$ times the frequency;
$j = \sqrt{-1}$
$R_{59}$ = value of resistor 59;
$I_1$ = current out of phase input 1.
Then:

$$\frac{(1 + jwR_{67}C_{69})}{R_{67}} R_{59}R_{68}I_1 = V(1') - V(1).$$

However the voltage drop across the phase winding 114 due to conductive impedance [V(c)] has the following relation:

$$V(C) = -(1 + jwL/R)RI_1.$$

Where:
R = resistance of winding 114;
L = inductance of winding 114.
For the back-emf voltage [Vemf] to appear at point 1' it must be that:

$$V(1') - V(1) = -V(C),$$

since:

$$Vemf = V(1) - V(c).$$

Then the desired condition is that:

$$\frac{(1 + jwR_{67}C_{69})}{R_{67}} R_{59}R_{68}I_1 = (1 + jwL/R)RI_1.$$

This gives the following relations for matching the values of elements within the circuit with the electrical characteristics of the stator winding 114 to compensate for conductive voltage drops:

$$R = \frac{R_{59}R_{68}}{R_{67}} ; L/R = R_{67}C_{69}.$$

With similar V.C. Circuits in the remaining phases of the drive circuit as illustrated in FIG. 3 in place, the three phase back-emf of the three phase stator windings 110, 112, and 114 appear at points 2', 3' and 1' respectively.

Figure 5:
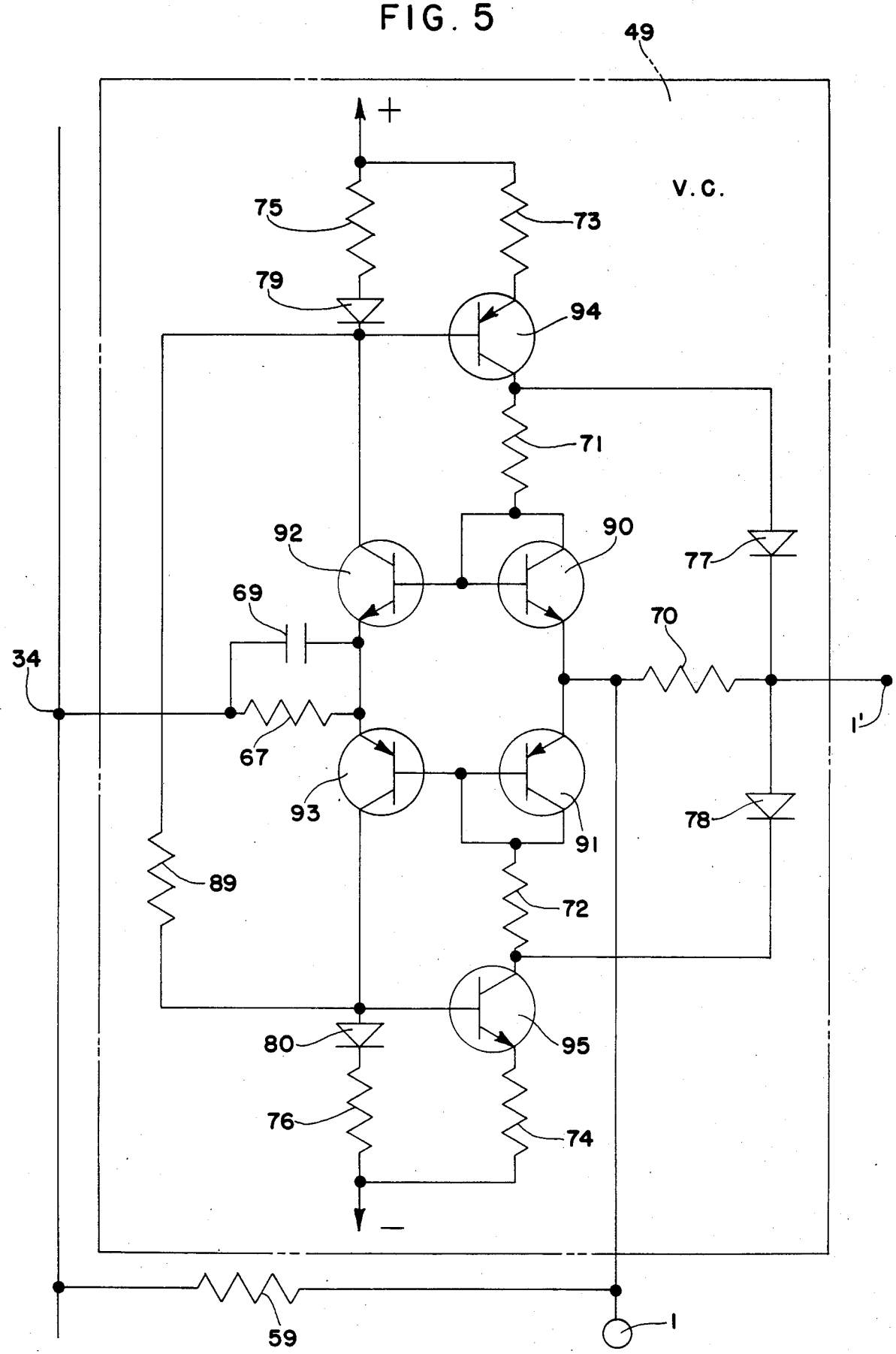

FIG. 5 illustrates a complementary current type V.C. circuit which may be used for V.C. 49. In this circuit also as in FIG. 4 compensation for the voltage drop across the stator winding 114 is provided. Also the values of the capacitor 69 and resistor 67 is the same in FIG. 5 as in FIG. 4. This circuit provides for the voltage across the resistor 67 to be the same as the voltage across the current sense resistor 59. The emitter-base voltage (Veb) of transistor 90 is used to balance the Veb of transistor 92 and the Veb of transistor 91 is used to balance the Veb of transistor 93. For example, when a current $I_1$ is flowing out of phase input 1 a voltage $R_{59}I_1$ appears across $R_{59}$. A collector current ($i_{92}$) will flow through transistor 92 such that the voltage across the parallel pair of $C_{69}$ and $R_{67}$ will equal $R_{59}I$, and no collector current ($i_{93}$) will flow through transistor 93 so that $$R_{59}I_1 = \frac{R_{67}}{1 + jwR_{67}C_{69}} i_{92}. \qquad [1]$$

(We will assume that base currents are negligible compared to collector currents and we will neglect for the moment the current through Resistor 89). The collector current $i_{92}$ will flow through diode 79 and resistor 75. Diode 79 serves as a bias for emitter-base voiltage (Veb) of transistor 94 so that the collector current of transistor 94 ($i_{94}$) is related to $i_{92}$ by the values of resistors 75 ($R_{75}$) and 73 ($R_{73}$) as $$R_{73}i_{94} = R_{75}i_{92}.$$

Also since the bias voltage of diode 77 will balance the Veb of transistor 90, the voltage drop across resistor 70 ($V_{70}$) equals the voltage drop across resistor 71 ($V_{71}$). Since $i_{94}$ is broken up into current through resistor 71 ($i_{71}$) and resistor 70 ($i_{70}$) then $$i_{94} = i_{71} + i_{70} = \frac{V_{71}}{R_{71}} + \frac{V_{70}}{R_{70}} = V_{70}\left(\frac{1}{R_{71}} + \frac{1}{R_{70}}\right)$$

or $$V_{70} = \frac{R_{71}R_{70}}{R_{71} + R_{70}} i_{94} = \frac{R_{71}R_{70}}{R_{71} + R_{70}} \frac{R_{75}}{R_{73}} i_{92}.$$

From earlier equation (1) relating $I_{92}$ to $I_1$ it is seen that $$V_{70} = \frac{R_{71}R_{70}}{R_{71} + R_{70}} \frac{R_{75}}{R_{73}} \frac{(1 + jwR_{67}C_{69})}{R_{67}} R_{59}I_1. \qquad [2]$$

But as stated above the Veb of transistor 90 should equal Veb of transistor 92. For similar transistors this implies the collector currents should be equal. Therefore, $$i_{92} = i_{90} = i_{71} = \frac{V_{71}}{R_{71}} = \frac{V_{70}}{R_{71}}, \text{ since } V_{70} = V_{71}.$$

Then for $V_{70}$ it is seen that $$V_{70} = R_{71}i_{92}$$

which from earilier equations [1] and [2] implies that $$\frac{R_{70}}{R_{71} + R_{70}} \frac{R_{75}}{R_{72}} = 1,$$

-continued
and $$V_{70} = \frac{(1 + jwR_{67}C_{69})}{R_{67}} R_{59}R_{71}I_1.$$

As seen in FIG. 4 and noting $V_{70} = V(1') - V(1)$ it is seen that $$\frac{(1 + jwR_{67}C_{69})}{R_{67}} R_{59}R_{71}I_1 = (1 + jwL/R)RI_1.$$

This as before gives the matching values of circuit elements as follows:

$$R = \frac{R_{59}R_{71}}{R_{67}}; L/R = R_{67}C_{69}.$$

$R_{71}$ in FIG. 5 takes the place of $R_{68}$ in FIG. 4. FIG. 5, however, has the additional internal condition that $$\frac{R_{70}}{R_{70} + R_{71}} \frac{R_{75}}{R_{73}} = 1.$$

The situation when $I_1$ is reversed produces a collector current $i_{93}$ flowing through transistor 93 and $i_{92}$ being zero. It is easily seen that the same conditions apply with $R_{76}=R_{75}$, $R_{74}=R_{73}$, and $R_{72}=R_{71}$. Finally the resistor 89 provides for a small current to activate the circuit. The net result is that at point 1' appears the potential of point 1 compensated by conductive impedance voltage drops producing a back-emf signal for stator winding 114. With similar circuits for V.C. 50 and V.C. 51 in FIG. 3 the operating circuit is obtained.

MODE OF OPERATION

The described circuit of FIG. 3 with its voltage compensation circuits will exhibit a conventional six-step three-phase bipolar switching wave form after it is started by some external force of auxiliary circuit. The switching will be in synchronism with the speed of the rotor independent of current or torque so long as the speed is above some minimum value to ensure sufficient back-emf to operate the invention. (This switching gives the motor the running characteristics of a d.c. motor.) The motor characteristics will be such that when the load increases at constant voltage the speed will decrease causing the windings to draw an increased current which in turn provides for increased torque. A balance is achieved between load and torque at some speed. In order to increase speed one needs only increase the d.c. source voltage which causes an increased winding current which in turn increases motor torque to increase speed at constant load. A balance is again achieved between load and torque at some greater speed. The rotor position, relative to a particular phase, at the commutation times remains at the optimum angle for torque since the circuit maximizes the conversion of electrical energy to mechanical energy by energizing the winding in phase with the winding Back-EMF. Therefore this proper commutation position occurs simultaneously with maximum Back-EMF of the same phase. Also the switching frequency in the circuit is directly proportional to the rotor speed and can be used as a speed signal.

The circuit described by its symmetry has no preferred direction and will operate equally well in either direction. The actual motor direction is determined by the starting direction since mechanical power is generated once the motor is started and the torque will be in the same direction as the rotation.

Obviously since the described invention is a Back-EMF controlled drive circuit, it requires a minimum Back-EMF to effect its operation of a motor. Therefore in its actual applications it can be mechanically started or it can be used in conjunction with a starting circuit or apparatus, or it can be used as part of a motor-generator system which may alternatingly generate electrical power from mechanical power or mechanical power from electrical power. One starting circuit that has been used for particular applications employed a two-step sequence of energizing pulses. The first pulse energized the stator to a particular magnetic state which caused the rotor to align itself with that state. The second pulse then energized the stator to provide a torque sufficient to cause the rotor to rotate and generate an EMF which operated the invention. Another starting circuit employed a forced six-step switching at some base frequency where the rotor would begin to follow the rotating stator field. Then the frequency would be slowly increased causing the rotor to speed up (stepper motor starting).

I claim:

1. A motor drive circuit having an input terminal, a neutral terminal, and a plurality of drive terminals, wherein each of said plurality of drive terminals being connected to a corresponding input switching means, said input switching means being controlled by a corresponding input signal and being connected to said input terminal for controlling current flow between said corresponding drive terminal and said input terminal, said input terminal and said neutral terminal being connected to a direct current power source, said drive terminals and said neutral terminal being connected to stator windings of a brushless motor having a permanent magnet rotor or a commutatorless motor having an energized rotor to provide a synchronous phase current drive in said motor, said synchronous phase current drive providing current flow through said stator windings against Back-EMFs of said stator windings after the motor being started by an external means, said circuit further comprises:

an input control means for each of said input switching means, for providing control therefor by controlling its corresponding input signal, said input control means being responsive to a potential of the drive terminal connected to the same input switching means;
signal means for providing a plurality of said input signals;
current limiting means for limiting current flow through said drive terminals.

2. A motor drive circuit as recited in claim 1, wherein said input control means including:
an input rectifying means being responsive to said potential for providing an input rectified signal;
an input signal switching means responsive to said input rectified signal for controlling said input signal.

3. A motor drive circuit having a source terminal, a sink terminal, and a plurality of drive terminals, wherein each of said plurality of drive terminals being connected to a corresponding source switching means and a corresponding sink switching means, said source switching means being controlled by a corresponding source signal and being connected to said source terminal for controlling current flow between said source terminal and said corresponding drive terminal, said sink switching means being controlled by a corresponding sink signal and being connected to said sink terminal for controlling current flow between said corresponding drive terminal and said sink terminal, said source terminal and said sink terminal being connected to a direct current power source, said drive terminals being connected to stator windings of a brushless motor having a permanent magnet rotor or a commutatorless motor having an energized rotor to provide a synchronous phase current drive in said motor, said synchronous phase current drive providing current flow through said stator windings against Back-EMFs of said stator windings after the motor being started by an external means, said circuit further comprises:

a source control means for each of said source switching means, for providing control therefor by controlling its corresponding source signal, said source control means being responsive to a potential of the drive terminal connected to the same source switching means;

a sink control means for each of said sink switching means, for providing control therefor by controlling its corresponding sink signal, said sink control means being responsive to a potential of the drive terminal connected to the same sink switching means;

signal means for providing a plurality of said source signals and said sink signals;

current limiting means for limiting current flow through said drive terminals.

4. A motor drive circuit as recited in claim 3, wherein said source control means including:

a source rectifying means responsive to said potential for providing a source rectified signal;

a source signal switching means responsive to said source rectified signal for controlling said source signal; and wherein said sink control means including:

a sink rectifying means responsive to said potential for providing a sink rectified signal;

a sink signal switching means responsive to said sink rectified signal for controlling said sink signal.

5. A motor drive circuit having an input terminal, a neutral terminal, and a plurality of drive terminals, wherein each of said plurality of drive terminals being connected to a corresponding input switching means, said input switching means being controlled by a corresponding input signal and being connected to said input terminal for controlling current flow between said corresponding drive terminal and said input terminal, said input terminal and said neutral terminal being connected to a direct current power source, said drive terminals and said neutral terminal being connected to stator windings of a brushless motor having a permanent magnet rotor or a commutatorless motor having an energized rotor to provide a synchronous phase current drive in said motor, said synchronous phase current drive providing current flow through said stator windings against Back-EMFs of said stator windings after the motor being started by an external means, said circuit further comprises:

compensating means for providing a compensation of potential differences due to conductive impedances associated with said stator windings;

an input control means for each of said input switching means, for providing control therefor by controlling its corresponding input signal, said input control means being responsive to said compensation and a potential of the drive terminal connected to the same input switching means;

signal means for providing a plurality of said input signals.

6. A motor drive circuit as recited in claim 5, wherein said input control means including:

an input rectifying means being responsive to said compensation and said potential for providing an input rectified signal;

an input signal switching means responsive to said input rectified signal for controlling said input signal.

7. A motor drive circuit having a source terminal, a sink terminal, and a plurality of drive terminals, wherein each of said plurality of drive terminals being connected to a corresponding source switching means and a corresponding sink switching means, said source switching means being controlled by a corresponding source signal and being connected to said source terminal for controlling current flow between said source terminal and said corresponding drive terminal, said sink switching means being controlled by a corresponding sink signal and being connected to said sink terminal for controlling current flow between said corresponding drive terminal and said sink terminal, said source terminal and said sink terminal being connected to a direct current power source, said drive terminals being connected to stator windings of a brushless motor having a permanent magnet rotor or a commutatorless motor having an energized rotor to provide a synchronous phase current drive in said motor, said synchronous phase current drive providing current flow through said stator windings against Back-EMFs of said stator windings after the motor being started by an external means, said circuit further comprises:

compensating means for providing a compensation of potential differences due to conductive impedances associated with said stator windings;

a source control means for each of said source switching means, for providing control therefor by controlling its corresponding source signal, said source control means being responsive to said compensation and a potential of the drive terminal connected to the same source switching means;

a sink control means for each of said sink switching means, for providing control therefor by controlling its corresponding sink signal, said sink control means being responsive to said compensation and a potential of the drive terminal connected to the same sink switching means;

signal means for providing a plurality of said source signals and said sink signals.

8. A motor drive circuit as recited in claim 7, wherein said source control means including:

a source rectifying means responsive to said compensation and said potential for providing a source rectified signal;

a source signal switching means responsive to said source rectified signal for controlling said source signal; and wherein said sink control means including:

a sink rectifying means responsive to said compensation and said potential for providing a sink rectified signal;

a sink signal switching means responsive to said sink rectified signal for controlling said sink signal.

9. A motor drive circuit having an input terminal, a neutral terminal, and a plurality of drive terminals, wherein each of said plurality of drive terminals being connected to a corresponding input switching means, said input switching means being controlled by a corresponding input signal and being connected to said input terminal for controlling current flow between said corresponding drive terminal and said input terminal, said input terminal and said neutral terminal being connected to a direct current power source, said drive terminals and said neutral terminal being connected to stator windings of a brushless motor having a permanent magnet rotor or a commutatorless motor having an energized rotor to provide a synchronous phase current drive in said motor, said synchronous phase current drive providing current flow through said stator windings against Back-EMFs of said stator windings after the motor being started by an external means, said circuit further comprises:

a current source means which provides an R.C. current for each of said drive terminals that flows through a parallel resistive and capacitive branch sufficient to cause a voltage across the said branch to be proportional to a current flowing through the corresponding drive terminal;

a bias means, which provides bias for each of said current source means, and being responsive to the R.C. current of the corresponding drive terminal;

an output signal means which provides an output signal for each of said drive terminals, said output signal being different from a potential of the corresponding drive terminal by an amount proportional to the R.C. current corresponding to the same drive terminal;

an input control means for each of said input switching means, for providing control therefor by controlling its corresponding input signal, said input control means being responsive to the output signal corresponding to the drive terminal connected to the same input switching means;

signal means for providing a plurality of said input signals.

10. A motor drive circuit as recited in claim 9, wherein said input control means including:

an input rectifying means being responsive to said output signal for providing an input rectified signal;

an input signal switching means responsive to said input rectified signal for controlling said input signal.

11. A motor drive circuit having a source terminal, a sink terminal, and a plurality of drive terminals, wherein each of said plurality of drive terminals being connected to a corresponding source switching means and a corresponding sink switching means, said source switching means being controlled by a corresponding source signal and being connected to said source terminal for controlling current flow between said source terminal and said corresponding drive terminal, said sink switching means being controlled by a corresponding sink signal and being connected to said sink terminal for controlling current flow between said corresponding drive terminal and said sink terminal, said source terminal and said sink terminal being connected to a direct current power source, said drive terminals being connected to stator windings of a brushless motor having a permanent magnet rotor or a commutatorless motor having an energized rotor to provide a synchronous phase current drive in said motor, said synchronous phase current drive providing current flow through said stator windings against Back-EMFs of said stator windings after the motor being started by an external means, said circuit further comprises:

a current source means which provides an R.C. current for each of said drive terminals that flows through a parallel resistive and capacitive branch sufficient to cause a voltage across the said branch to be proportional to a current flowing through the corresponding drive terminal;

a bias means, which provides bias for each of said current source means, and being responsive to the R.C. current of the corresponding drive terminal;

an output signal means which provides an ouput signal for each of said drive terminals, said output signal being different from a potential of the corresponding drive terminal by an amount proportional to the R.C. current corresponding to the same drive terminal;

a source control means for each of said source switching means, for providing control therefor by controlling its corresponding source signal, said source control means being responsive to the output signal corresponding to the drive terminal connected to the same source switching means;

a sink control means for each of said sink switching means, for providing control therefor by controlling its corresponding sink signal, said sink control means being responsive to the output signal corresponding to the drive terminal connected to the same sink switching means;

signal means for providing a plurality of said source signals and said sink signals.

12. A motor drive circuit as recited in claim 11, wherein said source control means including:

a source rectifying means responsive to said output signal for providing a source rectified signal;

a source signal switching means responsive to said source rectified signal for controlling said source signal; and wherein said sink control means including:

a sink rectifying means responsive to said output signal for providing a sink rectified signal;

a sink signal switching means responsive to said sink rectified signal for controlling said sink signal.

13. A motor drive circuit having an input terminal, a neutral terminal, and a plurality of drive terminals, wherein each of said plurality of drive terminals being connected to a corresponding input switching means, said input switching means being controlled by a corresponding input signal and being connected to said input terminal for controlling current flow between said corresponding drive terminal and said input terminal, said input terminal and said neutral terminal being connected to a direct current power source, said drive terminals and said neutral terminal being connected to stator windings of a brushless motor having a permanent magnet rotor or a commutatorless motor having an energized rotor to provide a synchronous phase current drive in said motor, said synchronous phase current drive providing current flow through said stator windings against Back-EMFs of said stator windings after the motor being started by an external means, said circuit further comprises:

means for providing a Back-EMF signal for each of said drive terminals, said Back-EMF signals indicative of said Back-EMFs of said stator windings;

an input control means for each of said input switching means, for providing control therefor by controlling its corresponding input signal, said input control means being responsive to the Back-EMF signal corresponding to the drive terminal connected to the same input switching means;

signal means for providing a plurality of said input signals.

14. A motor drive circuit as recited in claim 13, wherein said input control means including:

an input rectifying means being responsive to said Back-EMF signal for providing an input rectified signal;

an input signal switching means responsive to said input rectified signal for controlling said input signal.

15. A motor drive circuit having a source terminal, a sink terminal, and a plurality of drive terminals, wherein each of said plurality of drive terminals being connected to a corresponding source switching means and a corresponding sink switching means, said source switching means being controlled by a corresponding source signal and being connected to said source terminal for controlling current flow between said source terminal and said corresponding drive terminal, said sink switching means being controlled by a corresponding sink signal and being connected to said sink terminal for controlling current flow between said corresponding drive terminal and said sink terminal, said source terminal and said sink terminal being connected to a direct current power source, said drive terminals being connected to stator windings of a brushless motor having a permanent magnet rotor or a commutatorless motor having an energized rotor to provide a synchronous phase current drive in said motor, said synchronous phase current drive providing current flow through said stator windings against Back-EMFs of said stator windings after the motor being started by an external means, said circuit further comprises:

means for providing a Back-EMF signal for each of said drive terminals, said Back-EMF signals indicative of said Back-EMFs of said stator windings;

a source control means for each of said source switching means, for providing control therefor by controlling its corresponding source signal, said source control means being responsive to the Back-EMF signal corresponding to the drive terminal connected to the same source switching means;

a sink control means for each of said sink switching means, for providing control therefor by controlling its corresponding sink signal, said sink control means being responsive to the Back-EMF signal corresponding to the drive terminal connected to the same sink switching means;

signal means for providing a plurality of said source signals and said sink signals.

16. A motor drive circuit as recited in claim 15, wherein said source control means including:

a source rectifying means responsive to said Back-EMF signal for providing a source rectified signal;

a source signal switching means responsive to said source rectified signal for controlling said source signal; and wherein said sink control means including:

a sink rectifying means responsive to said Back-EMF signal for providing a sink rectified signal;

a sink signal switching means responsive to said sink rectified signal for controlling said sink signal.

* * * * *